(12) United States Patent
Bausch et al.

(10) Patent No.: US 10,632,957 B2
(45) Date of Patent: Apr. 28, 2020

(54) FRONTAL AIRBAG FOR VEHICLE OCCUPANTS AND AIRBAG MODULE

(71) Applicant: TRW AUTOMOTIVE GMBH, Alfdorf (DE)

(72) Inventors: Hans-Peter Bausch, Alfdorf (DE); Lothar Zink, Alfdorf (DE); Jochen Weiss, Heubach (DE)

(73) Assignee: TRW AUTOMOTIVE GMBH, Alfdorf (DE)

( * ) Notice: Subject to any disclaimer, the term of this patent is extended or adjusted under 35 U.S.C. 154(b) by 67 days.

(21) Appl. No.: 15/564,252

(22) PCT Filed: Apr. 7, 2016

(86) PCT No.: PCT/EP2016/000565
§ 371 (c)(1),
(2) Date: Oct. 4, 2017

(87) PCT Pub. No.: WO2016/165815
PCT Pub. Date: Oct. 20, 2016

(65) Prior Publication Data
US 2018/0126946 A1 May 10, 2018

(30) Foreign Application Priority Data
Apr. 17, 2015 (DE) .......... 10 2015 004 956

(51) Int. Cl.
*B60R 21/2338* (2011.01)
*B60R 21/233* (2006.01)
*B60R 21/00* (2006.01)

(52) U.S. Cl.
CPC ........ *B60R 21/2338* (2013.01); *B60R 21/233* (2013.01); *B60R 2021/0009* (2013.01);
(Continued)

(58) Field of Classification Search
CPC .............. B60R 21/233; B60R 21/2338; B60R 2021/0009; B60R 2021/23308; B60R 2021/23316; B60R 2021/23382
See application file for complete search history.

(56) References Cited

U.S. PATENT DOCUMENTS 6,254,121 B1 * 7/2001 Fowler ................. B60R 21/233
 280/729
6,308,983 B1 * 10/2001 Sinnhuber ............ B60R 21/233
 280/735
(Continued)

FOREIGN PATENT DOCUMENTS

DE 102007032763 1/2008
EP 1757495 8/2007
(Continued)

*Primary Examiner* — Frank B Vanaman
(74) *Attorney, Agent, or Firm* — Tarolli, Sundheim, Covell & Tummino LLP

(57) ABSTRACT

A frontal airbag for vehicle occupants, especially a passenger airbag, includes a contact panel (26) facing the vehicle occupant (12). Inside the airbag plural tethers (38) and/or partitions (38) are arranged which in portions withhold the contact panel (26) in the inflated state of the airbag (10) and form at least one lateral bead (34) and plural central beads (36) which in cross-section are smaller than the lateral beads (34). Furthermore, an airbag module is presented.

16 Claims, 1 Drawing Sheet

(52) U.S. Cl.
CPC ............... *B60R 2021/23308* (2013.01); *B60R 2021/23316* (2013.01); *B60R 2021/23382* (2013.01)

(56) References Cited

U.S. PATENT DOCUMENTS

| | | | | |
|---|---|---|---|---|
| 6,361,072 | B1* | 3/2002 | Barnes | B60R 21/233 280/728.1 |
| 2003/0034637 | A1* | 2/2003 | Wang | B60R 21/233 280/729 |
| 2003/0218325 | A1* | 11/2003 | Hasebe | B60R 21/233 280/743.2 |
| 2006/0186655 | A1* | 8/2006 | Ehrke | B60R 21/233 280/743.1 |
| 2006/0186656 | A1* | 8/2006 | Kumagai | B60R 21/231 280/743.2 |
| 2006/0279072 | A1* | 12/2006 | Hanawa | B60R 21/233 280/729 |
| 2007/0045997 | A1* | 3/2007 | Abe | B60R 21/231 280/729 |
| 2007/0262570 | A1* | 11/2007 | Choi | B60R 21/233 280/729 |
| 2011/0101655 | A1* | 5/2011 | Ishida | B60R 21/231 280/729 |
| 2012/0032421 | A1* | 2/2012 | Ahn | B60R 21/231 280/728.1 |

FOREIGN PATENT DOCUMENTS

| | | |
|---|---|---|
| JP | 2007099122 | 11/1990 |
| JP | H02283545 | 11/1990 |

* cited by examiner

FRONTAL AIRBAG FOR VEHICLE OCCUPANTS AND AIRBAG MODULE

RELATED APPLICATIONS

This application corresponds to PCT/EP2016/000565, filed Apr. 7, 2016, which claims the benefit of German Application No. 10 2015 004 856.9, filed Apr. 17, 2015, the subject matter of which are incorporated herein by reference in their entirety.

BACKGROUND OF INVENTION

The invention relates to a frontal airbag for vehicle occupants, especially a passenger airbag, for protecting in the case of frontal crash as well as to an airbag module.

Frontal airbags, especially for passengers, are accommodated in the vehicle structure of the vehicle ahead of the vehicle occupant when viewed in the driving direction and exit the same in the case of restraint so as to deploy in the direction of the occupant. The part of the airbag wall which faces the vehicle occupant in the inflated state and which the occupant enters into contact with is referred to as contact panel.

It is known to arrange tensile means, usually tethers, quite generally in airbags so as to impart a particular shape to the airbag, i.e. to prevent particular portions of the airbag wall from moving unhindered during deployment.

In frontal airbags, especially passenger airbags, it becomes more and more important to ensure protection not only in the case of frontal crash but also in the case of an angular crash.

When the head of the occupant impacts on the contact panel, it may happen in the case of angular crash that due to the force component of the angular crash acting perpendicularly to the longitudinal vehicle axis, the head will laterally slip off and/or the neck will be rotated.

SUMMARY OF THE INVENTION

It is therefore the object of the present invention to configure a frontal airbag for vehicle occupants, especially a passenger airbag, so that it is adapted to offer improved protection in the case of angular crash.

According to the invention, this is achieved by a frontal airbag for vehicle occupants, especially a passenger airbag, comprising a contact panel facing the vehicle occupant in the inflated state, wherein inside the airbag tensile means which in portions restrain the contact panel in the inflated state of the airbag are arranged on the contact panel. The tensile means are arranged so that the contact panel forms a lateral bead at least on one of its two lateral edges and between the lateral edges forms plural central beads which are smaller in cross-section than are the lateral beads. The lateral edges are the edges on the left and on the right, when viewed from the occupant, that delimit the contact panel. The lateral bead(s) accordingly extend substantially from the top to the bottom, depending on the shape of the contact panel, but in addition also in the longitudinal vehicle direction, where appropriate. It is also imaginable to arrange the central beads substantially horizontally.

The central beads generate a less hard restraining surface than the lateral beads so that the occupant's head may immerse into a central portion of the contact panel, viz. between the lateral edges. In this way, the head is prevented from rotating in the case of angular crash by sliding off the contact panel too quickly and a rotation of the neck is prevented from resulting therefrom. Along with immersing also the position of the head is stabilized. The lateral bead or the two lateral beads then form an additional protection against lateral movement or slipping of the head and of the upper body part of the occupant in the case of angular crash.

The beads may extend substantially cylindrically in the area of the contact panel.

The fastening of the tethers is facilitated by the fact that at least two tethers which are arranged directly next to each other and delimit a central bead in the area of the contact panel are fastened at the same position and/or by the same seam on the rear panel. The tethers thus extend, when viewed from the top onto the inflated airbag, V-shaped with the open side of the "V" toward the occupant. In this variant, it is also especially easily possible to combine the two neighboring tethers into one tether which then is arranged and fastened in the area of the folding position on the rear panel.

The central beads may end, when viewed toward the occupant and from the top onto the inflated airbag, substantially in a plane. As an alternative to this, it is also possible to have one or more central beads end further distant from the occupant and to have adjacent central beads located somewhat outside protrude more closely to the occupant so that an arc-shaped wrapping around the occupant is resulting.

Inter alia two different variants are taken into consideration which ensure the contact panel to be softer in the area of the central beads than in the area of the lateral beads. On the one hand, when the airbag has one single chamber to be inflated and the internal airbag pressure is equal throughout, in the contact panel there are resulting lower surface tensions in the area of the central beads which facilitate immersion of the occupant, as compared to the higher surface tensions in the lateral bead or the lateral beads. When, however, plural chambers are configured inside the airbag and the chambers assigned to the lateral bead(s) are provided with higher internal pressure, also here the resistance to immersion is higher in the area of the lateral beads than in the area of the central beads. In this way, too, lateral deviation of the occupant in the area of the head and the chest and thus rotation of the head is reduced or even prevented.

Due to the different sizes of the beads or bead radii, the surface formed by the contact panel has differently hard and soft portions so that specifically softer portions can be produced into which the occupant may immerse or into which the occupant may be moved when he/she first impacts on adjacent harder portions.

The lateral beads have a depth larger than that of the central beads by at least the factor 1.25, especially by at least the factor 1.5, wherein the depth of the lateral beads is measured from the contact-side end of the adjacent tensile means in the longitudinal vehicle direction. The depth of the central beads is usually measured from a connecting straight line of the contact panel-side ends of the tensile means thereof delimiting the same.

In addition or as an alternative, also the width measured horizontally and transversely to the longitudinal vehicle axis of the lateral bead(s), i.e. the maximum width, is definitely larger than the width of the central beads, namely at least by the factor 1.5, especially at least by the factor 1.75.

In general, the side wall should be harder in the area of the lateral beads than in the area of the central beads. This can be achieved solely by choosing the geometry of the beads, i.e. the contact panel in combination with the tensile means, and/or by different internal pressures in the area of the different beads.

One embodiment of the invention provides that at least several tensile means are tethers.

The airbag may include one single chamber to be inflated so that the internal pressure inside the airbag is completely uniform.

The at least one tensile means may be a tether, wherein tethers can be very easily sewn to the airbag wall.

The airbag may optionally include one single chamber to be inflated in its interior so that the internal pressure is equal in the area of all beads.

On the other hand, a further embodiment of the invention provides at least several tensile means to be partitions which divide the interior of the airbag into different chambers. This division, on the one hand, results in longer beads and, on the other hand, enables to optionally inflate the chambers at different points in time and/or to fill them with different internal pressures.

When the chambers in the inflated state of the airbag have different internal pressures, it is especially advantageous when the internal pressure at least in a central chamber is lower than the internal pressure of lateral chambers. In this way, also here the lateral chambers counteract displacement of the occupant on the contact panel. Then the occupant is positioned in the center, just like in the case of a trampoline.

The tensile means may be fastened to a rear panel opposed to the contact panel and thus may extend substantially in the longitudinal vehicle direction, when viewed from the top.

The rear panel of the airbag includes e.g. mounting holes for arranging the airbag on the module side. The tensile means can be attached especially in the area close to the mounting hole so that the airbag module, more exactly speaking the module holder and the mounting of the inflator, may also serve for holding the rear panel of the airbag.

The invention moreover relates to an airbag module comprising at least one inflator and an airbag according to the invention. The airbag has a rear panel opposed to the contact panel by which it is fastened to the side of the airbag module.

In the airbag module according to the invention, the airbag may include different chambers in its interior and the at least one inflator is connected to the interior of the airbag so that the chambers are inflated to a different extent and have different infernal pressures. In this case, too, especially the internal pressure of a central chamber is lower than the internal pressure of lateral chambers. The central chambers may especially be those chambers which are configured to include the central beads.

In this context at the lateral edges the airbag optionally includes the afore-mentioned lateral beads defined by a lateral chamber and plural central chambers forming central beads in the contact panel. The central chambers in this context preferably have the lower internal pressure. The internal pressure may advantageously be lower at least by the factor 1.25 than the pressure prevailing in the lateral chambers.

BRIEF DESCRIPTION OF THE DRAWINGS

Further features and advantages of the invention will be evident from the following description and from the following drawings which are referred to and wherein.

DESCRIPTION

Figure 1:
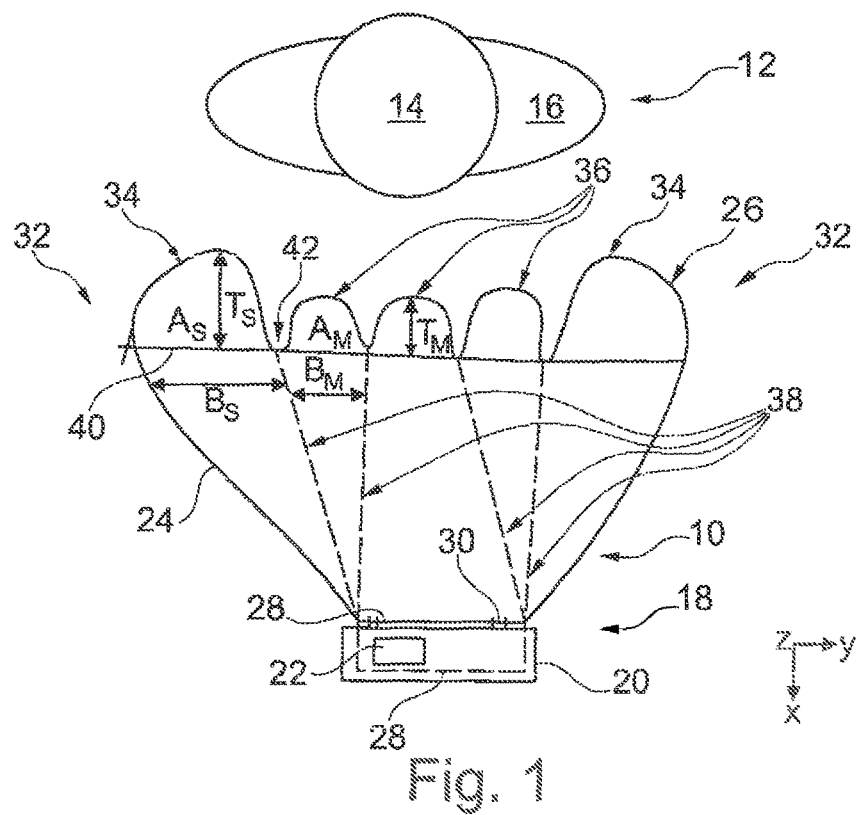
FIG. 1 shows a top view onto an inflated frontal airbag according to the invention as part of an airbag module according to the invention in the mounted and inflated state.

In FIG. 1 a frontal airbag 10, more exactly speaking a front passenger airbag is illustrated. The airbag 10 is shown in the mounted and completely inflated state. The longitudinal vehicle direction in the driving direction boars the coordinate x and the transverse vehicle direction in the horizontal direction bears the coordinate y. The occupant 12 is shown with his/her head 14 and his/her torso 16.

The airbag 10 is part of an airbag module 18 comprising a module housing 20 and an inflator 22 accommodated in the module housing 20. In the folded state, the airbag 10 is accommodated in the module housing 20.

It has to be emphasized that the inflator 22 may be a single-stage or multi-stage inflator comprising one or more exhaust openings spaced apart from each other. Alternatively, also plural inflators 22 are possible.

The airbag 10 includes an outer wall 24 having plural portions, wherein the area facing the vehicle occupant 12 in the inflated state is referred to as contact panel 26. Moreover, there is a rear panel 28 opposite to the contact panel 16 which is fastened on the module side via fastening openings 30, for example.

The inflator(s) 22 may be arranged inside the airbag 10 so that the rear panel is not located, as in FIG. 1, toward the occupant distant from the inflator, but is positioned, as shown by broken lines, inside the airbag module even if the airbag 10 is inflated.

When the inflator 22 is disposed outside the airbag 10, the rear panel 28 has to include appropriate inflating openings, of course.

As shown in FIG. 1, the airbag 10 has a shape widening toward the occupant, when viewed from the top.

The contact panel 26 includes, when viewed from the occupant, two lateral edges 32 each of which has a lateral bead 34 extending toward the occupant i.e. against the driving direction x. The lateral beads 34 form the lateral ends of the contact panel 26. Between the lateral beads 34 the contact panel has plural central beads 36 being laterally delimited so-to-speak by the lateral beads 34.

The contour of the contact panel 26 is obtained by tensile means 38 located inside the airbag 10 which are tethers in the embodiment shown in FIG. 1. Said tensile means 38 are fastened, on the one hand, to the contact panel 26 by their end close to the occupant and there result in a constriction 42 and, on the other hand, are fastened to the rear panel 28 at their opposite end.

In the embodiment shown in FIG. 1, which is not meant to be limiting, two directly adjacent tensile means 38 are fastened in the area of the contact panel 26 distant from each other, but in the area of the rear panel 28 at the same fastening position so that they are diverging in V-shape toward the occupant when viewed from the top.

The two lateral beads 34 and a transition to the directly adjacent central bead 36 are defined by the two laterally outer tensile means 38. By way of example, which is not meant to be limiting either, there is a central bead 36 between the outer central beads 36. However, there may as well be provided more than three central beads 36 or only two central beads 36, for example.

It is clearly visible from FIG. 1 that the radii of the lateral beads 34 and the cross-sections thereof are larger than the radii and, resp., cross-sections of the central beads 36. The cross-section thereof is determined in a top view. The beads 34, 36 start from a line 40 extending substantially in the Y direction which passes through the point or points of contact of the assigned tensile means 38 with the contact panel 26. In the embodiment shown in FIG. 1, all of the connecting lines between the contact points are located on a line 40 which is a straight line, which need not absolutely be the case, however. The cross-sections $A_S$ of the lateral beads are in any case larger than the cross-sections of the central beads $A_M$, wherein in FIG. 1 only one of the lateral beads 34 at a time and one of the central beads 36 at a time is denoted with $A_S$ or $A_M$.

The depth $T_S$ of the lateral beads 34 measured in the longitudinal vehicle direction X is larger by at least the factor 1.25, especially by at least the factor 1.5, than the respective maximum depth $T_M$ of the central beads 36. In this case, too, the depth is measured from the afore-explained line 40.

The width, too, measured in the Y direction, namely the maximum width $B_S$ of the lateral beads 34 is definitely larger, namely at least by the factor 1.5, especially at least by the factor 1.75, than the maximum width $B_M$ of the central beads 36. When the widths or depths of the lateral beads 34 and of the central beads 38 are different, the indication refers to the smallest lateral bead 34 and the largest central bead 36.

In the embodiment shown in FIG. 1, the airbag 10 has one single chamber to be inflated, for in the Z direction the tensile means 36 are so narrow that no different chambers having different pressures are formed in this way.

It has to be emphasized that the shown tensile means 38 in the Z direction may also symbolize plural superimposed tensile means. The beads 34, 36 furthermore are optionally cylindrical at least over a portion or over the entire contact panel, which is not meant to ha limiting, however.

The constrictions 42 formed by the tensile means 38, only one constriction of which is provided with the reference numeral 42 in FIG. 1 to maintain the survey, may extend over the entire vertical height of the contact panel 26 or may end ahead of the upper and/or the lower edge of the contact panel 26.

Since, as explained before, only one single chamber to be inflated is present, the internal pressure is equal throughout after inflation of the airbag 10. Due to the different curvatures and different sizes of the beads 34, 36, in the area of the lateral beads 34 the contact panel has a greater surface tension than in the area of the central beads 36. This means that immersing in the area of the central beads 36 is easier than in the area of the lateral beads 34. Hence, in the case of angular impact, as compared to the lateral beads 34 the occupant will immerse more easily in the area of the central beads 36, which helps to stabilize the head against lateral rotation. However, the lateral beads 34 serve for imparting stability to the airbag 10 and, in addition, to exclude slipping off the contact panel 26.

The embodiment according to FIG. 2 substantially corresponds to that shown in FIG. 1 so that hereinafter only the differences will be discussed and the previously used and introduced reference numerals are used for like or functionally like parts, areas or portions.

Figure 2:
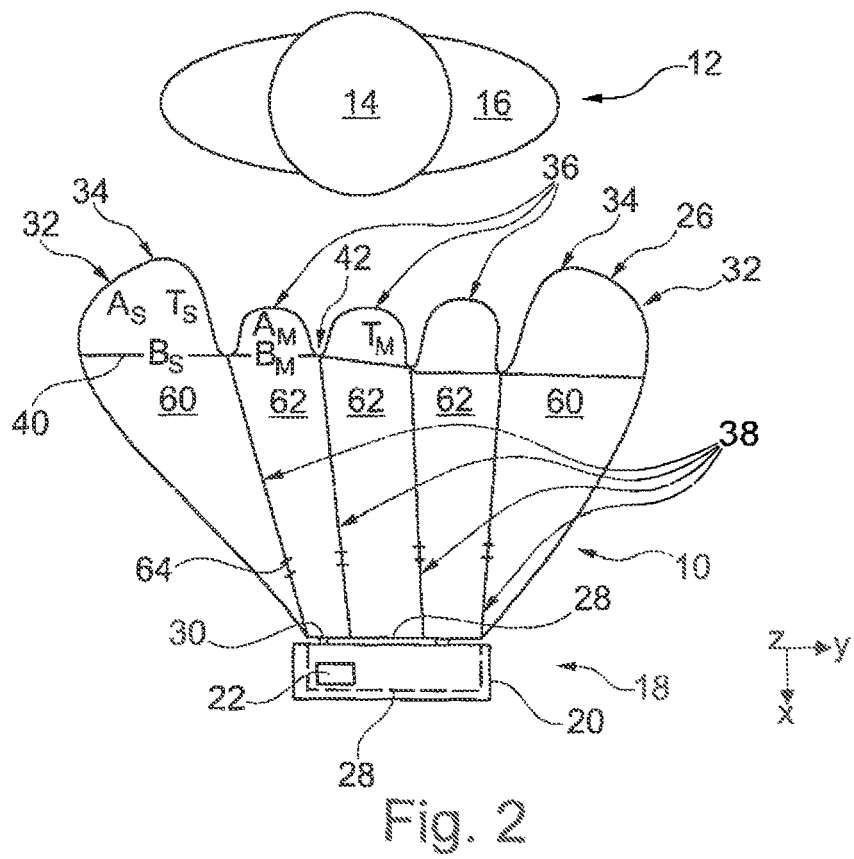
FIG. 2 shows a top view onto a second embodiment of the frontal airbag according to the invention and the airbag module according to the invention equally in the mounted and inflated state.

In the embodiment according to FIG. 2, the tensile means 38 or at least some of the tensile means 38 are in the form of partitions so that plural chambers are resulting in the interior of the airbag 10. The lateral beads 34 are formed by a lateral chamber 60 in each case, the central beads are the end portions of central chambers 62 facing the occupant.

Preferably, which is not meant to be limiting, each bead 34, 36 has its own chamber 60 or 62, i.e. one chamber is provided for each bead.

The lateral chambers 60 are inflated, as compared to the central chambers 62, to a higher internal pressure than the central chambers 62. For this purpose, appropriate gas-conducting ducts may start from the gas generator or generators 22. Moreover, it is possible to provide different flow courses, for example the lateral chambers 60 could be inflated first, and the central chambers 82 then could be filled via overflow orifices 64 in the partitions.

In this embodiment, too, the different internal pressures facilitate immersing into the central beads 36 and the respective central chambers 62 thereof, as compared to immersing into the lateral beads 34 and the corresponding lateral chambers 60 thereof.

It is also evident in the embodiment according to FIG. 2 that the central one of the central beads 36 is defined by indentations 42 which are not on a line 40 extending in parallel to the direction Y. In this case, the cross-section $A_M$ and the depth $T_M$ are defined by a connecting line of the respective contact points of the adjacent partitions extending angularly relative to the direction Y with the contact panel 40.

In this case, too, the portions of the contact panel 26 defining the lateral beads 34 exhibit higher surface tension than the portions of the contact panel 26 defining the central beads 36 by the higher internal pressure of the airbag in the lateral chambers 60.

Instead of two lateral beads 34, the airbags 10 illustrated in FIGS. 1 and 2 may also be formed to have only one lateral bead, with the latter being located at the lateral edge which is close to the side window assigned to the occupant 12. Also, a variant would be imaginable in which the one lateral bead is arranged on the inner side so as to prevent slipping off toward the neighboring vehicle occupant.

The outer wall of the airbag 10 preferably consists of fabric material and may have one or more cut parts.

It is emphasized that the individual features need not necessarily be linked in the way shown in FIGS. 1 and 2 but that individual features representing preferred variants only may also be omitted. Just as well, features may be combined in the individual embodiments although they are not illustrated to be combined in the drawings.

The invention claimed is:

1. A frontal airbag for vehicle occupants, comprising a contact panel (26) configured to face the vehicle occupant (12) in a fully deployed state of the airbag (10), wherein inside the airbag tensile means (38) which in portions withhold the contact panel (26) in the fully deployed state of the airbag (10) are arranged at the contact panel (26), wherein in the fully deployed state of the airbag (10), the airbag (10) is expanded to a maximum extent of the airbag (10), the tensile means (38) are extended to a maximum extent of the tensile means (38), and the tensile means (38) are arranged so that the contact panel (26) forms a lateral bead (34) on at least one of its two lateral edges (32) and forms plural central beads (36) which in cross-section are smaller than the at least one lateral bead (34) between the lateral edges (32), wherein the lateral bead(s) (34) extend substantially from a top to a bottom of the airbag (10), and whereby in the contact panel (26) there are lower surface tensions in the area of the central beads (36) as compared to the higher surface tensions in the lateral bead or the lateral beads (34).

2. The frontal airbag according to claim 1, wherein at least one constriction (42) formed by the tensile means (38) extends over an entire vertical height of the contact panel (26).

3. The frontal airbag according to claim 1, wherein at least some of the beads (34, 36) extend cylindrically substantially in the area of the contact panel (26).

4. The frontal airbag according to claim 1, wherein the at least one lateral bead (34) has a depth ($T_S$) measured from a contact panel-side end of a corresponding tensile means (38) in the longitudinal vehicle direction (x) which is larger at least by the factor 1.25 than the depth ($T_M$) of the central beads (36).

5. The frontal airbag according to claim 1, wherein the at least one lateral bead (34) has a maximum width ($B_S$) measured horizontally and transversely to a longitudinal vehicle axis, said width being larger at least by the factor 1.5 than a maximum width ($B_M$) of the central beads (36).

6. The frontal airbag according to claim 1, wherein at least several tensile means (38) comprise tethers.

7. The frontal airbag according to claim 1, wherein the airbag (10) has one single chamber to be inflated.

8. The frontal airbag according to claim 1, wherein at least some of the tensile means (38) are partitions for dividing the interior of the airbag into different chambers (60, 62).

9. The frontal airbag according to claim 8, wherein the chambers (60, 62) are configured so that, in the fully deployed state, they have different internal pressures.

10. The frontal airbag according to claim 9, wherein the internal pressure of at least one central chamber (62) is lower than the internal pressure of the at least one lateral chamber (60).

11. The frontal airbag according to claim 8, wherein the tensile means (38) are fastened to a rear panel (28) opposite to the contact panel (26).

12. The frontal airbag according to claim 11, wherein the rear panel (28) includes fastening holes (30) for fastening the airbag (10) to a side of a module housing (20) of an airbag module.

13. An airbag module comprising at least one inflator (22) and an airbag (10) according to claim 9, wherein the at least one inflator is connected to the interior of the airbag so that the chambers (60, 62) are inflated to different extents and have different internal pressures.

14. The airbag module according to claim 13, wherein at each of the lateral edges (32) the airbag (10) includes a lateral bead (34) having a lateral chamber (60) as well as plural central chambers (62) forming central beads (36) on the contact panel (26).

15. The airbag module according to claim 14, wherein in the fully deployed state the lateral chambers (60) have an internal pressure higher than that of the central chambers (62).

16. An airbag module comprising at least one inflator (22) and one airbag (10) according to claim 1, wherein the airbag (10) includes a rear panel (28) opposite to the contact panel (26), the rear panel (28) of the airbag (10) being fastened to a side of a module housing (20) of the airbag module.

* * * * *